US011493265B2

United States Patent
Sanders (10) Patent No.: US 11,493,265 B2
(45) Date of Patent: Nov. 8, 2022

(54) REFRIGERATED FOOD PAN COOLING DEVICE

(71) Applicant: ILLINOIS TOOL WORKS INC., Glenview, IL (US)

(72) Inventor: Joseph F. Sanders, North Richland Hills, TX (US)

(73) Assignee: ILLINOIS TOOL WORKS INC, Glenview, IL (US)

( * ) Notice: Subject to any disclaimer, the term of this patent is extended or adjusted under 35 U.S.C. 154(b) by 230 days.

(21) Appl. No.: 17/023,558

(22) Filed: Sep. 17, 2020

(65) Prior Publication Data
US 2021/0088269 A1 Mar. 25, 2021

Related U.S. Application Data (60) Provisional application No. 62/903,313, filed on Sep. 20, 2019.

(51) Int. Cl.
*F25B 41/40* (2021.01)
*F25D 25/00* (2006.01)
(Continued)

(52) U.S. Cl.
CPC ........ *F25D 25/005* (2013.01); *A47J 37/1271* (2013.01); *F25B 41/40* (2021.01);
(Continued)

(58) Field of Classification Search
CPC .......... F25B 39/04; F25B 41/40; F25D 17/02; F25D 17/06; F25D 23/061;
(Continued)

(56) References Cited

U.S. PATENT DOCUMENTS 3,520,277 A 7/1970 Gordon
3,910,227 A 10/1975 Reece
(Continued)

FOREIGN PATENT DOCUMENTS

GB 2376513 12/2002
WO WO 2006045700 A1 5/2006

OTHER PUBLICATIONS

PCT, International Search Report and Written Opinion, International Application No. PCT/US2020/051144; dated Nov. 25, 2020, 13 pages.

*Primary Examiner* — Filip Zec
(74) *Attorney, Agent, or Firm* — Thompson Hine LLP (57) ABSTRACT

A refrigerated food pan cooling device includes a food pan receiving well and a cooling system, wherein the cooling system includes a refrigeration system with a compressor, a condenser, a metering device and an evaporator. The evaporator includes at least one first refrigerant line downstream of the metering device and upstream of the compressor. The first refrigerant line runs along an external surface of at least one of the well walls. The condenser is configured as a hot wall condenser, that lacks any fan or blower, wherein the hot wall condenser includes at least one second refrigerant line downstream of the compressor and upstream of the metering device. The second refrigerant line runs, at least partly, along an internal surface of at least the first exterior sidewall to transfer heat through the first exterior sidewall to ambient air.

16 Claims, 8 Drawing Sheets

(51) Int. Cl.
*A47J 37/12* (2006.01)
*F25D 17/02* (2006.01)
*F25D 17/06* (2006.01)
*F25D 29/00* (2006.01)

(52) U.S. Cl.
CPC .............. *F25D 17/02* (2013.01); *F25D 17/06* (2013.01); *F25D 29/00* (2013.01); *F25D 2400/08* (2013.01); *F25D 2700/12* (2013.01)

(58) Field of Classification Search
CPC ............... F25D 2400/08; F25D 25/005; F25D 2700/12; F25D 29/00; F25D 31/00; A23L 13/03; A23P 20/12; A47J 37/1271
See application file for complete search history.

(56) References Cited

U.S. PATENT DOCUMENTS

| | | |
|---|---|---|
| 4,182,260 A | 1/1980 | Reece |
| 4,210,074 A | 7/1980 | Laughman |
| 4,458,586 A | 7/1984 | Reed |
| 4,550,677 A | 11/1985 | Reese et al. |
| 4,862,824 A | 9/1989 | Reece |
| 4,898,664 A | 2/1990 | Reece |
| 4,936,246 A | 6/1990 | Reece |
| 4,952,309 A | 8/1990 | King |
| 5,020,427 A | 6/1991 | Kennefick et al. |
| 5,052,330 A | 10/1991 | Stacy |
| 5,226,354 A | 7/1993 | Stewart |
| 5,265,525 A | 11/1993 | Stewart |
| 6,505,547 B1 | 1/2003 | Burnett |
| 6,557,363 B1 | 5/2003 | Haasis |
| 6,722,150 B1 | 4/2004 | Carr |
| 7,089,763 B2 * | 8/2006 | Forsberg .................. F24F 1/027 62/635 |
| 2003/0221438 A1 * | 12/2003 | Rane .................... F28D 15/0275 62/271 |
| 2004/0107718 A1 * | 6/2004 | Bowman ................. F25B 39/02 165/122 |
| 2011/0239676 A1 | 10/2011 | Saunders |
| 2015/0253062 A1 | 9/2015 | Lintker |
| 2016/0153691 A1 | 6/2016 | Mean |
| 2018/0184815 A1 | 7/2018 | Potdar |

* cited by examiner

REFRIGERATED FOOD PAN COOLING DEVICE

TECHNICAL FIELD

This application relates generally to food preparation and, more specifically, to a refrigerated device with food pan wells to facilitate preparation of food items, such as a breading table for in-kitchen breading of food items in preparation for frying or grilling, etc.

BACKGROUND

Various food products are coated with batter and breading prior to cooking. The food products may be dipped into a liquid batter and then covered with a breading material (spiced or un-spiced) by rolling the batter covered food product in the breading material. The coated food product is then cooked such as by deep frying or the like. Breading tables to facilitate the process are known. For example, U.S. Pat. No. 6,505,547 discloses a movable breading table with an internal refrigeration system to cool the batter and breading pans, where the refrigeration system includes one or more fans. In the kitchen environment, having a blowing fan in the vicinity of the breading table, where fine breading material, such as flour, may be dispersed into the air, is undesirable. In addition, the breading table in U.S. Pat. No. 6,505,547 cools the pans using refrigerated coils in direct contact with the pans, which is also undesirable.

It would be desirable to provide a breading table that can keep food product in the pans adequately cool while at the same time avoiding the need for a blowing fan.

SUMMARY

In another aspect, a refrigerated device includes a housing including a food item holding arrangement having a well for receiving and holding one or more food pans, the well defined by multiple well walls, including a bottom well wall and multiple well sidewalls, the housing further including at least a first and second exterior sidewalls spaced apart from the well walls. A cooling system incorporated into the housing for cooling food pans in the well includes a refrigeration system with a compressor, a condenser, a metering device and an evaporator. The evaporator includes at least one first refrigerant line downstream of the metering device and upstream of the compressor, wherein the first refrigerant line runs along an external surface of at least one of the well walls in a heat exchange relationship with the well wall for cooling the well wall. The condenser is configured as a hot wall condenser, that lacks any fan or blower, wherein the hot wall condenser includes at least one second refrigerant line downstream of the compressor and upstream of the metering device, wherein the second refrigerant line runs, at least partly, along an internal surface of at least the first exterior sidewall in a heat exchange relationship with the first exterior sidewall to transfer heat through the first exterior sidewall to ambient air.

In another aspect, a refrigerated device includes a housing supporting a food item holding arrangement having a well for receiving and holding one or more food pans, the well defined by multiple well walls, including a bottom well wall and multiple well sidewalls, the housing including an internal compartment bounded by at least a first and second exterior sidewalls spaced apart from the well walls, wherein the internal compartment is open to ambient air. A cooling system for cooling food pans in the well includes a refrigeration system with a compressor, a condenser, a metering device and an evaporator. The evaporator includes at least one first refrigerant line downstream of the metering device and upstream of the compressor, wherein the first refrigerant line runs along an external surface of at least one of the well walls in a heat exchange relationship with the well wall for cooling the well wall. The condenser is configured as a hot wall condenser with a first heat exchange assembly including a first exterior heat exchange panel, a first interior heat exchange panel and a second refrigerant line downstream of the compressor and upstream of the metering device, wherein the second refrigerant line is, at least partly, sandwiched between the first exterior heat exchange panel and the first interior heat exchange panel, in a heat exchange relationship with both the first exterior heat exchange panel and the first interior heat exchange panel, to exchange heat through the first exterior heat exchange panel with ambient air exterior of the device and to exchange heat through the first interior heat exchange panel with ambient air in the internal compartment.

The details of one or more embodiments are set forth in the accompanying drawings and the description below. Other features, objects, and advantages will be apparent from the description and drawings, and from the claims.

DETAILED DESCRIPTION

Figure 1:
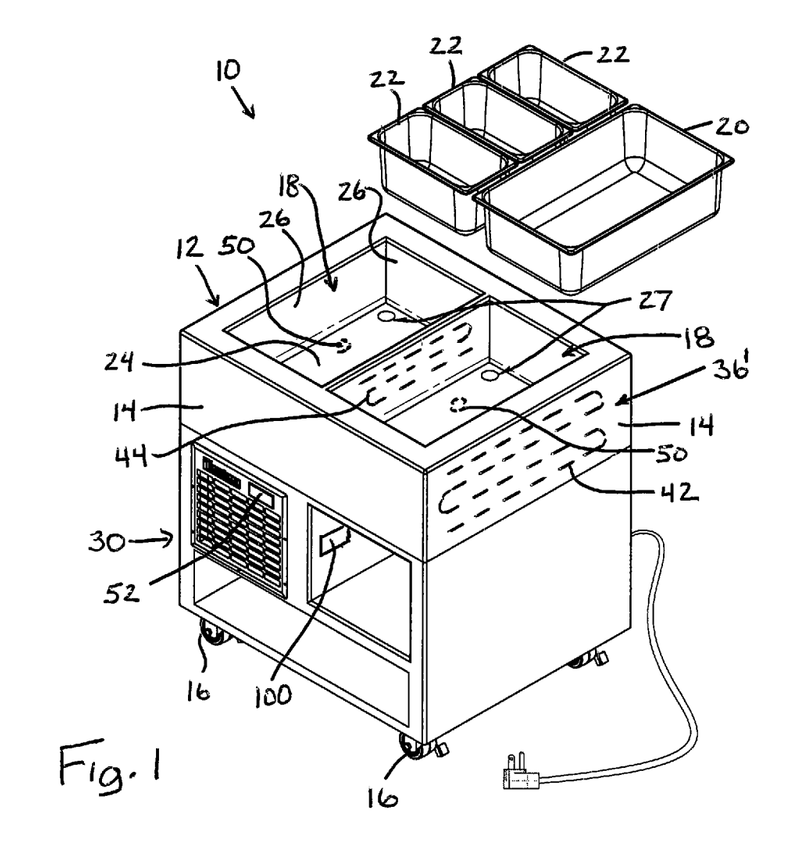
FIGS. 1-3 show perspective views of one embodiment of a refrigerated food pan cooling device.
Figure 2:
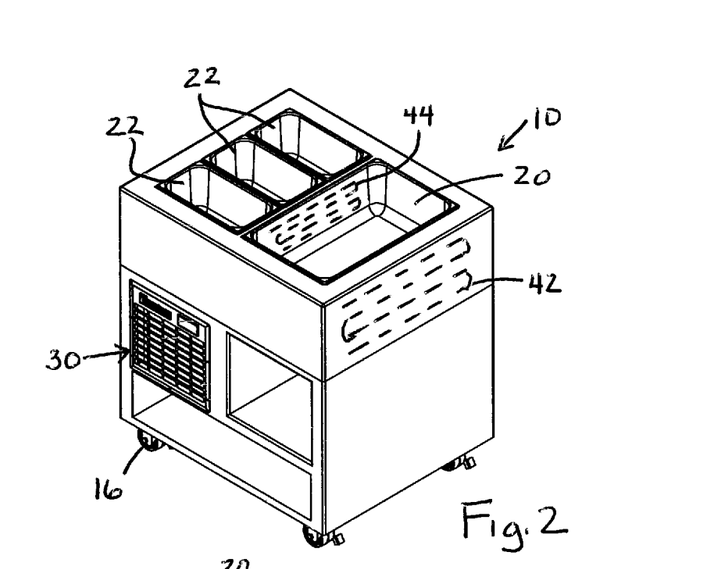
Figure 3:
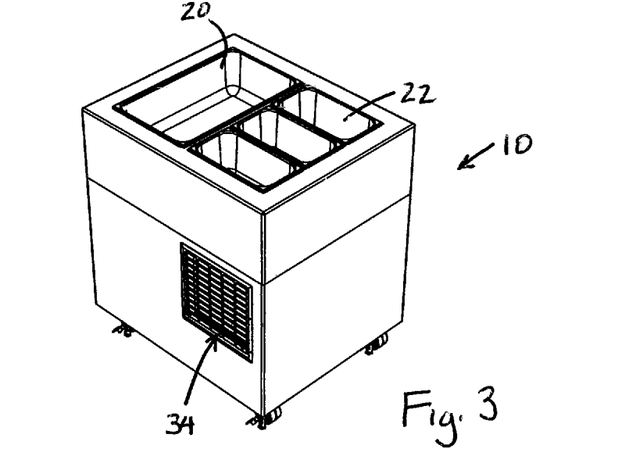

Referring to FIG. 1-3, a refrigerated device in the form of a breading table 10 includes a housing 12 (e.g., a frame structure with metal skin walls, such as stainless steel or aluminum), where the housing is supported on lockable wheels 16 for mobility. The housing 12 includes a food item holding arrangement having a pair of wells 18, each well for receiving and holding one or more food pans 20, 22, where the food pans (e.g., of stainless steel or aluminum) may be supported by pan rims that engage with upper perimeter portions of the wells. Each well is defined by multiple well walls (e.g., of metal), including a bottom well wall 24 and multiple well sidewalls 26. In some embodiments, each bottom wall has a drain opening 27 leading to a drain tube/pipe that can be closed and opened via a manual valve (not shown). However, the drain opening and valve are not required. Exterior walls 14 (e.g., of metal plate/panel configuration) of the housing are spaced from the well sidewalls 18 to accommodate refrigerant lines therein, as will be explained in further detail below.

Figure 4:
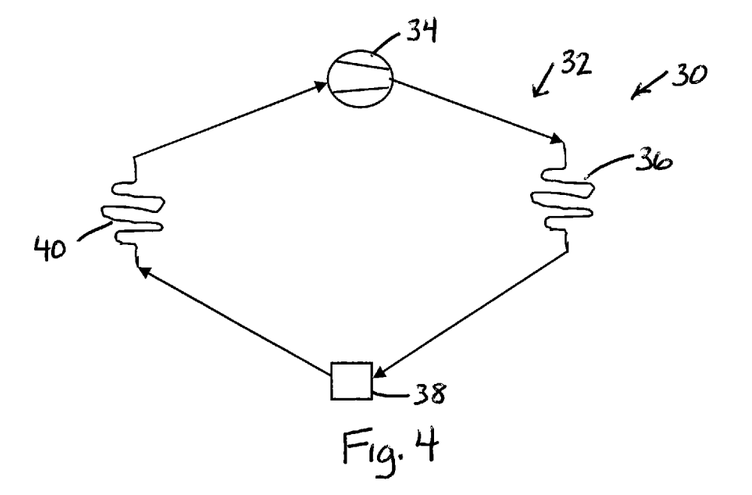
FIG. 4 shows a schematic diagram of a refrigeration circuit.

A cooling system 30 incorporated into the housing 12 for cooling the food pans in the wells. The cooling system 30 includes a refrigeration system 32 with a compressor 34, a condenser 36, an expansion valve 38 (or other metering device, such as capillary tube(s)) and an evaporator 40 as shown in the simple refrigeration circuit schematic of FIG. 4. Notably, the condenser 36 does not incorporate an associated fan/blower. In this regard, and referring again to FIG. 1, the condenser is configured as a hot wall condenser 36' formed by a refrigerant line 42, which is downstream of the compressor 34 and upstream of the expansion valve 38, where refrigerant line 42 runs along an internal surface one or more of the exterior sidewalls 14 in a heat exchange relationship with the exterior sidewall to transfer heat from the refrigerant medium through the exterior sidewall(s) 14 to ambient air. The heated ambient air rises, creating a natural convective upflow along the exterior sidewall(s) 14 drawing cooler air upward along the exterior sidewall(s) 14 from below. To more effectively take advantage of such air flow, the hot wall condenser 36' may be located along an upper section of the housing, such as somewhere on the upper half of the housing height.

Here, the evaporator is formed by at least one refrigerant line 44, which is downstream of the expansion valve 38 and upstream of the compressor 34, where the refrigerant line 44 runs along an external surface of at least one of the walls in a heat exchange relationship with the well wall for cooling the well wall. Heat is transferred from the well(s) 18 to the refrigerant line 44 so as to maintain the food product in the pans 20, 22 at a suitable temperature. In embodiments in which water is located in the wells, heat transfer from the food pans to the well walls may be through the water. However, the heat transfer from the food pans to the well walls can be directly from the food pan walls to the well walls or across a small air gap between the food pan walls and the well walls.

A controller 100 is provided to control the refrigeration system 32. In this regard, one or more temperature sensors 50 may be provided to detect the temperature of the water or air within the wells 18. For example, the temperature sensor(s) 50 may be located adjacent the lower surface of the bottom well wall(s) 24 for this purpose. The refrigeration system can then be controlled to maintain the water or air within the wells at a specified temperature (e.g., 33° F.) suitable for cooling the pans and food product. A user interface, including a display 52 may be provided for enabling operator control and/or providing information on operational status and temperature conditions etc.

Figure 5:
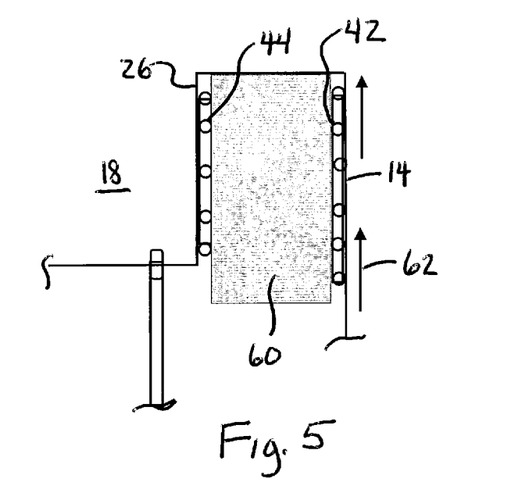
FIG. 5 shows a partial cross-section of the device.
Figure 6:
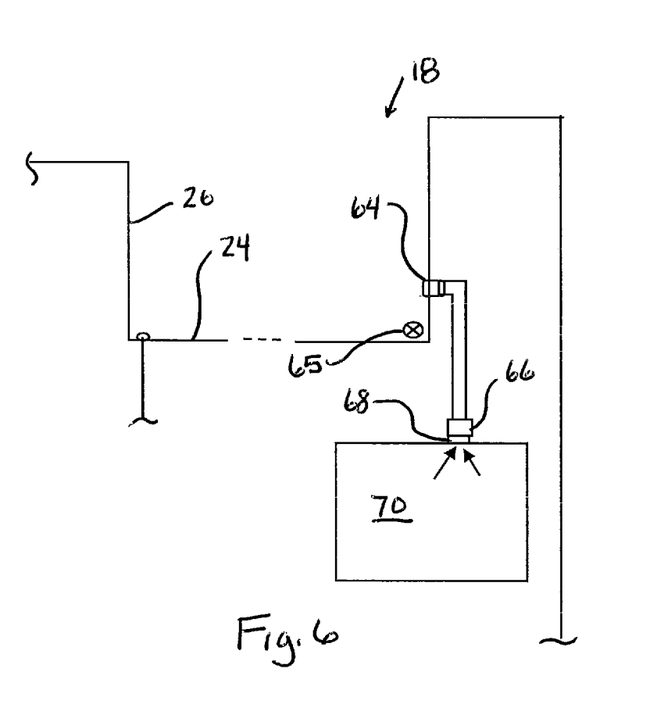
FIG. 6 shows another partial cross-section.
Figure 7:
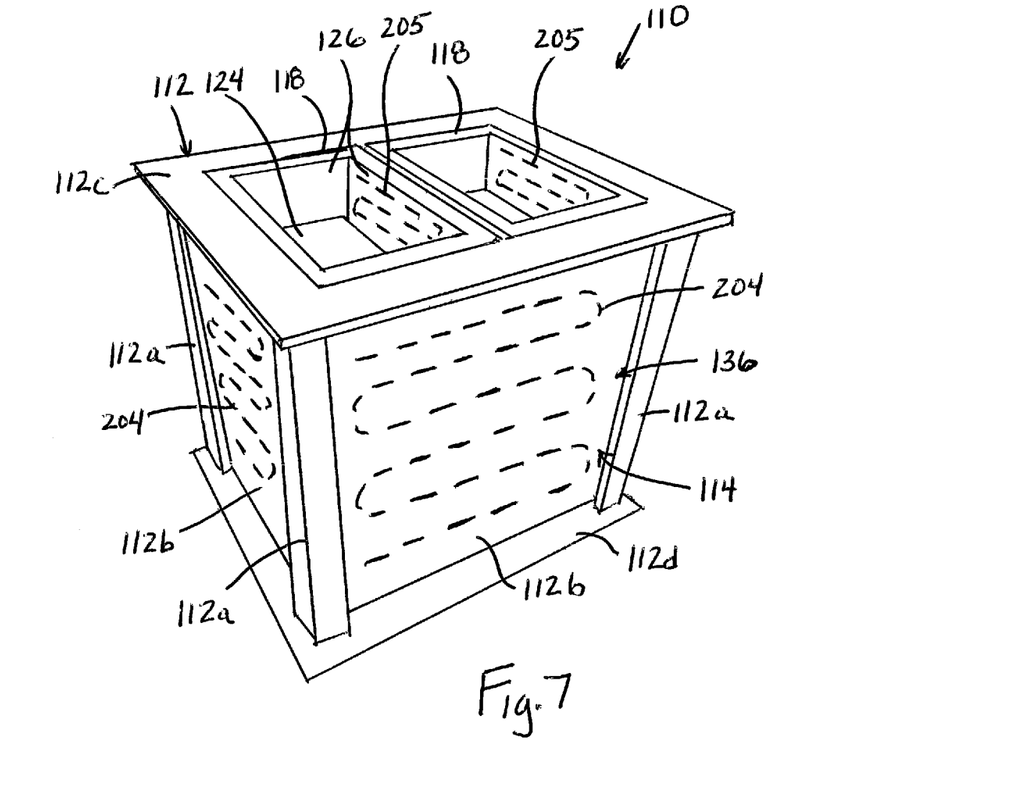
FIG. 7 shows a perspective view of another embodiment of a refrigerated food pan cooling device.
Figure 8:
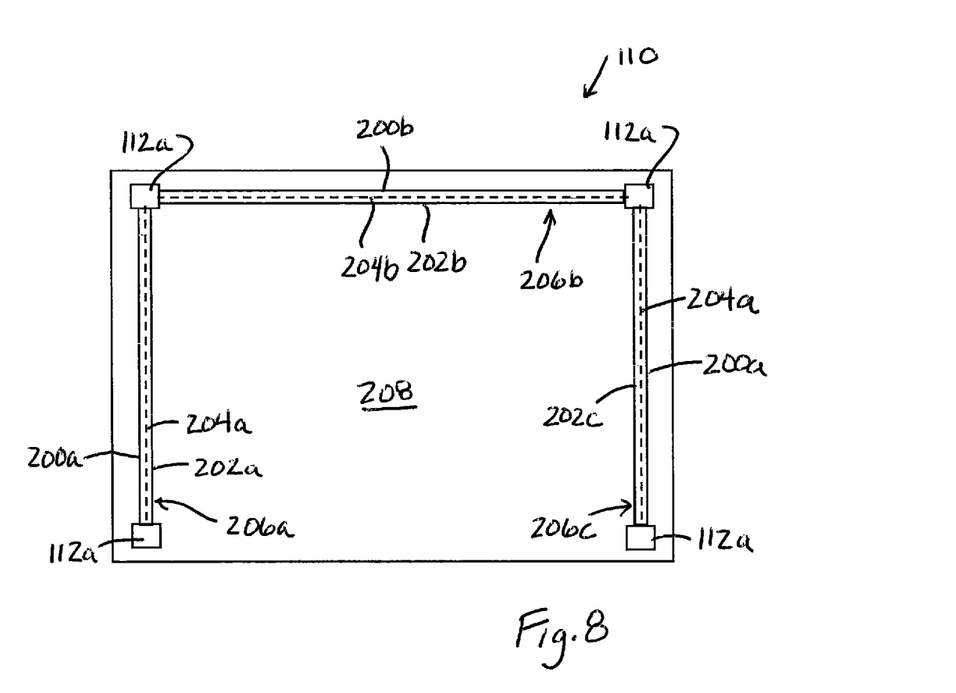
FIG. 8 shows a cross-section of the device of FIG. 7 taken along a horizontal plane below the food pan wells.

FIG. 5 shows an exemplary section view showing the spacing between a well sidewall 26 and an exterior wall 14, with refrigerant lines 42 and 44 shown, and insulation material 60 (e.g. urethane foam) therebetween. The natural convective upflow is also shown by arrow 62. In addition, in order to agitate water or air within the well(s) 18 an agitator may be provided and is shown here in the form of one or more nozzles 64 that eject air into the water. FIG. 6 shows a side mounted injection nozzle 64, where the injected air is sourced from a small fan 66 with a downwardly facing intake having an associated intake filter 68, where the intake may be associated with a compartment area 70 of the breading table. Of course, other types of agitators could be used, such as mechanical agitators 65 to move the water or air. Vibration could be used. A source of vibration would be a linkage from the compressor to the bottom of the well.

Although the refrigerant line 44 forming the evaporator is shown in the above embodiment on well sidewalls, the refrigerant line could, in addition, or alternatively, also be along bottom well wall. Although two wells 14 are illustrated, the breading table (or other type refrigerated device) may have only a single well or may have more than two wells. A single refrigeration system 30 may be used to cool multiple wells, in which case the lines from the evaporator of each well may run in series or in parallel, and the lines forming the condenser for each well may run in series or in parallel. Alternatively, each well may have its own independently operating refrigeration system.

Referring now to FIGS. 7-10, another embodiment of a refigured device in the form of a breading table 110 is shown and includes a housing 112 formed by a frame structure including corner frame posts 112a, metal skin walls 112b, such as stainless steel or aluminum, extending between the corner frame posts, an upper wall 112c which provides a food preparation area and a bottom wall 112d. The exterior sidewalls 114 of the housing comprise the metal skin walls 112b. The housing is supported on lockable wheels (per 16 in FIG. 1) for mobility. The housing 112 includes a food item holding arrangement having a pair of wells 118, each well for receiving and holding one or more food pans (not shown, but per 20 and 22 in FIG. 1), where the food pans (e.g., of stainless steel or aluminum) may be supported by pan rims that engage with upper perimeter portions of the wells. Each well is defined by multiple well walls (e.g., of metal), including a bottom well wall 124 and multiple well sidewalls 126. Each well bottom wall has a drain opening leading to a drain tube/pipe that can be closed and opened via a manual valve (not shown).

A cooling system (e.g., per 30 of FIG. 4) is incorporated into the housing 112 for cooling the food pans in the wells. The cooling system includes a refrigeration system 32 with a compressor 34, a condenser 36, an expansion valve 38 (or other metering device, such as capillary tube(s)) and an evaporator 40 as shown in the simple refrigeration circuit schematic of FIG. 4. Again, the condenser 36 does not incorporate an associated fan/blower.

In this regard, and referring again to FIGS. 7 and 8, the condenser is configured as a hot wall condenser 136 formed by a refrigerant line or lines 204, which is/are downstream of the compressor 34 and upstream of the expansion valve 38, where refrigerant line(s) 204 run, at least partly between interior and exterior heat exchange panels (e.g., stainless or aluminum plate). Refrigerant lines or segments 205 associated with the food pan wells are also shown. Here, three exterior heat exchange panels 200a-200c are provided and three interior heat exchange panels 202a-202c are provided, arranged in pairs 200a, 202a and 200b, 202b and 200c, 202c. Each pair has a refrigeration line, or segment, 204a, 204b and 204c (shown as dashed lines in FIG. 8), sandwiched between the heat exchange panels (e.g., running in a serpentine manner therebetween) and in heat exchange relationship with each of the heat exchange panels. Each set of panels and refrigerant line segment makes up a respective heat exchange assembly 206a, 206b and 206c. Notably, the three assemblies form a three-sided internal storage compartment 208 below the food pane wells of the device. One side 210 of the compartment is open to ambient air, and each of the interior heat exchange panels 202a-202c is exposed to the ambient air in the compartment 208, so that each refrigerant line segment 204a-204c transfers heat both through its respective exterior heat exchange panel 200a-200c to ambient air and through its respective interior heat exchange panel 202a-202c to ambient air in the internal compartment.

Figure 9:
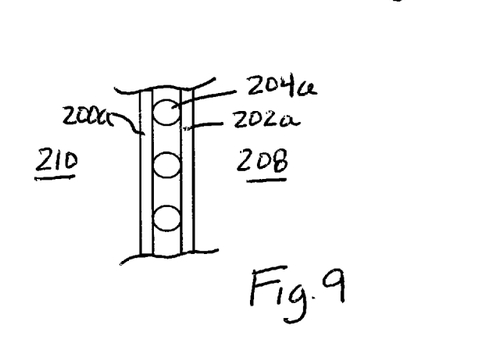
FIG. 9 shows a partial cross-section of a heat exchange assembly of the device.

FIG. 9 provides an enlarged partial cross-section view of the heat exchange assembly 206a. This dual heat exchange, through both sides of each heat exchange assembly, with exterior ambient 210 and ambient of the internal compartment 208, enhances performance.

Figure 10:
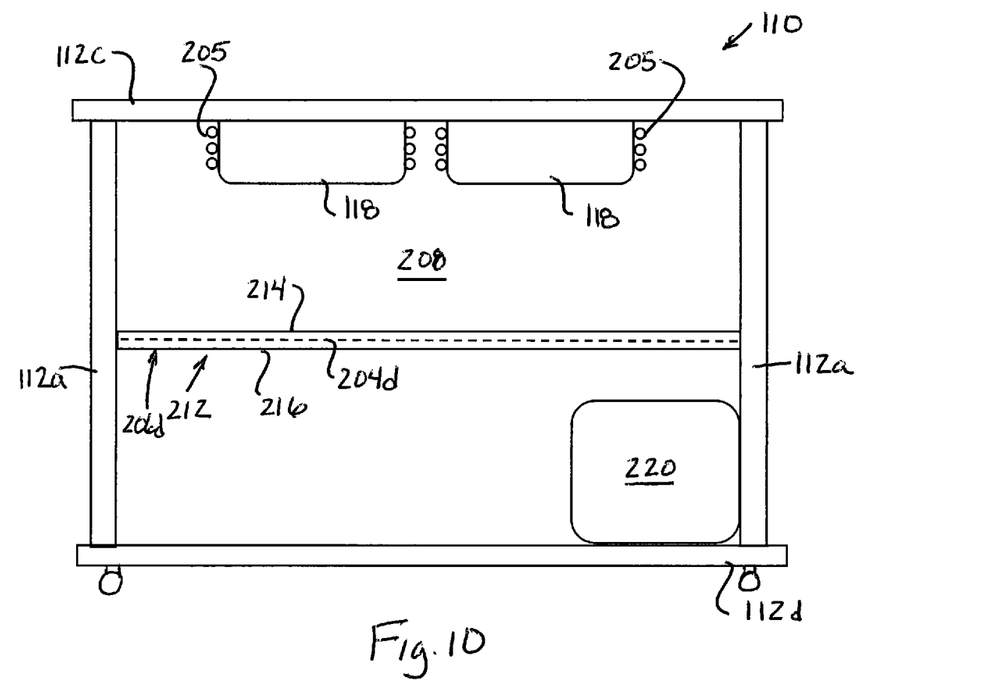
FIG. 10 shows a schematic side elevation of the device of FIG. 7.

As shown schematically in FIG. 10, the internal compartment 208 may also include an internal shelf 212. The shelf 212 can be formed as a further heat exchange assembly 206d, with an upper heat exchange panel 214, a lower heat exchange panel 216 and a refrigeration line or segment 204d sandwiched between the panels 214 and 216 in heat exchange relationship with the panels. The shelf 212 therefore also provides dual-sided heat exchange with ambient air within the compartment 208. In addition, the bottom wall 112d could also be formed, at least partly, as a further heat exchange assembly with upper and lower heat exchange panels.

Figure 11A:
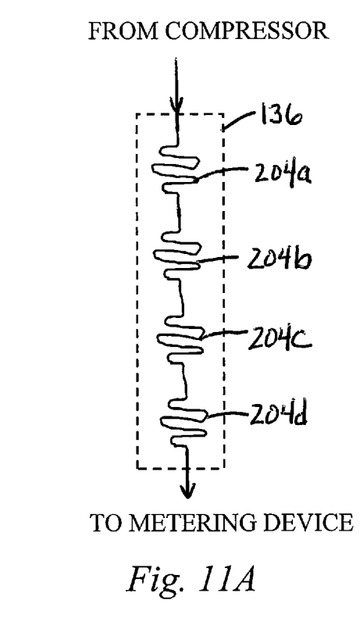
FIGS. 11A and 11B show exemplary configurations of the hot wall condenser line segments.
Figure 11B:
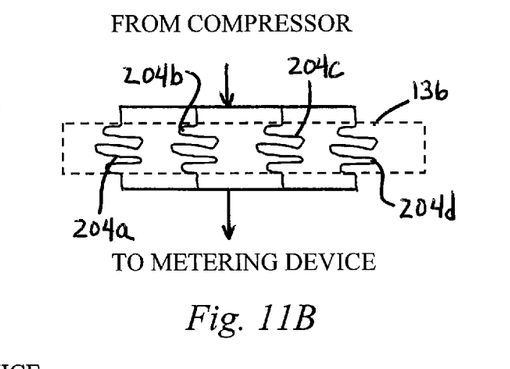

The various refrigeration line segments 204a-204d that make up the hot wall condenser 136 of the device 110 could be arranged in series (back to back) per FIG. 11A or in parallel per FIG. 11B.

The compressor 34 may be located within a hermetically sealed compartment 220 within the storage compartment 208, with no openings to allow for the entrance of dust, dirt, insects etc. Each heat exchange assembly 206a-206d may also be sealed along with electronics/controller of the device. This enables the device to be washed from all sides, including the bottom. The device 110 could also incorporate the same or similar agitation structure of device 10, or could be implemented without such agitation structure.

Notably, in both devices 10 and 110, the hot wall condenser is located over a height that at least partially overlaps with a height of the well(s) of the device.

It is to be clearly understood that the above description is intended by way of illustration and example only, is not intended to be taken by way of limitation, and that other changes and modifications are possible. Although the above embodiments primarily describe a breading table configuration, it is recognized that the features could be incorporated into other refrigerated devices including food pan wells (e.g., salad bar units, condiment rails, etc.).

What is claimed is:

1. A refrigerated device, comprising:
   a housing including a food item holding arrangement having a well for receiving and holding one or more food pans, the well defined by multiple well walls, including a bottom well wall and multiple well sidewalls, the housing further including at least a first and second exterior sidewalls spaced apart from the well walls;
   a cooling system incorporated into the housing for cooling food pans in the well, wherein the cooling system includes a refrigeration system with a compressor, a condenser, a metering device and an evaporator, wherein:
      the evaporator comprises at least one first refrigerant line downstream of the metering device and upstream of the compressor, wherein the first refrigerant line runs along an external surface of at least one of the well walls in a heat exchange relationship with the well wall for cooling the well wall;
      the condenser is configured as a hot wall condenser, that lacks any fan or blower, wherein the hot wall condenser comprises at least one second refrigerant line downstream of the compressor and upstream of the metering device, wherein the second refrigerant line runs, at least partly, along an internal surface of at least the first exterior sidewall in a heat exchange relationship with the first exterior sidewall to transfer heat through the first exterior sidewall to ambient air.

2. The refrigerated device of claim 1, further comprising a pan, wherein the well holds water or air and the pan that is partially surrounded by the water or air, wherein the water or air is cooled by heat transfer to the first refrigerant line through the well wall and the pan is cooled by heat transfer to the water or air.

3. The refrigerated device of claim 2, further comprising:
   a temperature sensor positioned for indicating a temperature of the well; and
   a controller configured to control the refrigeration system responsive to the temperature sensor.

4. The refrigerated device of claim 1, wherein the hot wall condenser comprises a first heat exchange assembly including a first exterior heat exchange panel and a first interior heat exchange panel, wherein the second refrigerant line is, at least partly, sandwiched between the first exterior heat exchange panel and the first interior heat exchange panel, in a heat exchange relationship with both the first exterior heat exchange panel and the first interior heat exchange panel, wherein the first exterior heat exchange panel forms at least part the first exterior sidewall of the housing.

5. The refrigerated device of claim 4, wherein housing includes an internal compartment below the well, wherein the internal storage compartment is open to ambient air, and wherein the second refrigerant line transfers heat through the interior heat exchange panel to ambient air in the internal compartment.

6. The refrigerated device of claim 5, wherein the hot wall condenser further comprises a second heat exchange assembly including a second exterior heat exchange panel and a second interior heat exchange panel, wherein the second refrigerant line is, at least partly, sandwiched between the second exterior heat exchange panel and the second interior heat exchange panel, in a heat exchange relationship with both the second exterior heat exchange panel and the second interior heat exchange panel, wherein the second exterior heat exchange panel forms at least part the second exterior sidewall of the housing.

7. The refrigerated device of claim 6, wherein the second exterior sidewall of the housing runs substantially perpendicular to the first exterior sidewall of the housing.

8. The refrigerated device of claim 6, wherein the hot wall condenser further comprises a third heat exchange assembly including an upper heat exchange panel and a lower heat exchange panel, wherein the second refrigerant line is, at least partly, sandwiched between the upper heat exchange panel and the lower heat exchange panel, in a heat exchange relationship with both the upper heat exchange panel and the lower heat exchange panel, wherein the third heat exchange assembly forms, at least partly, a shelf within the internal storage compartment.

9. The refrigerated device of claim 5, wherein the compressor is located with a hermetically sealed compressor compartment within the housing.

10. The refrigerated device of claim 2, further comprising:
    an agitator for agitating the water or air within the well to enhance heat transfer between one or both of (i) the pan and the water or air or (ii) the water or air and the first refrigerant line.

11. The refrigerated device of claim 1, wherein the hot wall condenser is located over a height that at least partially overlaps with a height of the well.

12. A refrigerated device, comprising:
    a housing supporting a food item holding arrangement having a well for receiving and holding one or more food pans, the well defined by multiple well walls, including a bottom well wall and multiple well sidewalls, the housing including an internal compartment bounded by at least a first and second exterior sidewalls spaced apart from the well walls, wherein the internal compartment is open to ambient air;

a cooling system for cooling food pans in the well, wherein the cooling system includes a refrigeration system with a compressor, a condenser, a metering device and an evaporator, wherein:

the evaporator comprises at least one first refrigerant line downstream of the metering device and upstream of the compressor, wherein the first refrigerant line runs along an external surface of at least one of the well walls in a heat exchange relationship with the well wall for cooling the well wall;

the condenser is configured as a hot wall condenser with a first heat exchange assembly including a first exterior heat exchange panel, a first interior heat exchange panel and a second refrigerant line downstream of the compressor and upstream of the metering device, wherein the second refrigerant line is, at least partly, sandwiched between the first exterior heat exchange panel and the first interior heat exchange panel, in a heat exchange relationship with both the first exterior heat exchange panel and the first interior heat exchange panel, to exchange heat through the first exterior heat exchange panel with ambient air exterior of the device and to exchange heat through the first interior heat exchange panel with ambient air in the internal compartment.

13. The refrigerated device of claim 12, wherein the hot wall condenser further comprises a second heat exchange assembly including a second exterior heat exchange panel, a second interior heat exchange panel and the second refrigerant line, wherein the second refrigerant line is, at least partly, sandwiched between the second exterior heat exchange panel and the second interior heat exchange panel, in a heat exchange relationship with both the second exterior heat exchange panel and the second interior heat exchange panel, to exchange heat through the second exterior heat exchange panel with ambient air exterior of the device and to exchange heat through the second interior heat exchange panel with ambient air in the internal compartment.

14. The refrigerated device of claim 13, wherein the hot wall condenser further comprises a third heat exchange assembly including an upper heat exchange panel and a lower heat exchange panel, wherein the second refrigerant line is, at least partly, sandwiched between the upper heat exchange panel and the lower heat exchange panel, in a heat exchange relationship with both the upper heat exchange panel and the lower heat exchange panel, wherein the third heat exchange assembly forms, at least partly, a shelf within the internal storage compartment.

15. The refrigerated device of claim 14, wherein the second refrigerant line is made up of multiple segments arranged in series.

16. The refrigerated device of claim 14, wherein the second refrigerant line is made up of multiple segment arranged in parallel.

* * * * *